Figure 1:
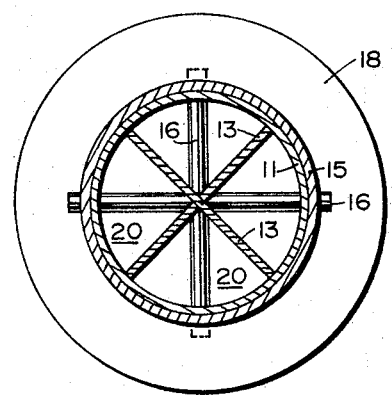

July 25, 1967 R. R. AMBROGI 3,332,766
MOLTEN GLASS DISPENSING PLUNGER NEEDLE
Filed Jan. 9, 1964

INVENTOR.
Raymond R. Ambrogi
BY
ATTORNEY

United States Patent Office 3,332,766
Patented July 25, 1967

3,332,766
MOLTEN GLASS DISPENSING PLUNGER NEEDLE
Raymond R. Ambrogi, Corning, N.Y., assignor to Corning Glass Works, Corning, N.Y., a corporation of New York
Filed Jan. 9, 1964, Ser. No. 336,819
4 Claims. (Cl. 65—330)

This invention relates to an improved needle construction, and more particularly to a hollow internally reinforced metallic structure forming an elongated heat resistant flow control needle for high temperature fluids such as molten glass.

In the past, it has been customary to fabricate flow control needles with either a solid refractory construction or with a molybdenum core plated or cladded on the outside with platinum. Neither of these known types of construction has been completely satisfactory for various reasons. When utilizing the solid refractory needle, for example, it was found that upon being subjected to the heat of molten glass large internal stresses developed which produced severe warping of the needle structure, resulting in uncontrolled runouts. In addition, the molten glass in contact with the refractory needle produced a serious erosion problem due to thermal cracking and spalling of the refractory.

The platinum clad molybdenum needle, having a solid molybdenum core, necessitated the provision of a vacuum applied to a bore running the length of such core, in order to prevent oxygen from coming in contact with the molybdenum. Since the temperature at which a glass flow control needle is normally utilized is above about 800° C., such temperature would normally promote oxidation of the molybdenum, and accordingly a constant vacuum was required internally of the needle to inhibit oxidation therewithin.

It was not possible to merely form the cladded molybdenum needle with a sealed internal vacuum chamber, since a puncture in the platinum cladding would permit glass and oxygen to enter the needle and promote oxidation, thus resulting in a complete failure of the needle. Accordingly, it was necessary to provide means to maintain and constantly draw a vacuum within the interior of the needle to prevent the oxidation of the molybdenum, should the platinum cladding suffer a puncture. Further, due to the differential rates of expansion between molybdenum and platinum, it was found that the cladded molybdenum needle would, upon being subjected to the heat of glass, not only expand unevenly, thus resulting in detrimental runouts, but also produce rupturing in the clad-core interface. In addition, the massive weight of both the solid refractory needle and the molybdenum cladded needle produced creeping and elongation which further promoted runouts at the flow control orifice.

Basically, my invention relates to a hollow needle construction of heat resistant or refractory metal which is not readily oxidizable, such as platinum or platinum rhodium alloy, wherein a hollow tube or cylinder of such metal of required length is provided with a hemispherical cap or nose portion on its lower end and has internal bracing ribs or webbing secured therein. The lower end or nose of the needle, which will be in contact with the molten glass, is machined to provide longitudinal straightness and radial concentricity which, due to my improved construction, is maintained during high temperature operation and thereby avoids detrimental runout. The uniform composition metallic construction not only eliminates warping due to expansion differences experienced in composite needles, but also eliminates the necessity of a vacuum environment required in cladded molybdenum needles. The internal bracing or webbing, which is of the same composition as the outer tubular shell and nose portion, forms a plurality of compartments which are provided with vent means communicating with one another, and accordingly this improved unitary construction of uniform composition permits the needle to be subjected to large heat shocks without fear of breakage. That is, the vented compartments provide for a uniform interior temperature throughout the interior of the needle, and accordingly expansion rates are substantially uniform throughout the needle.

It thus has been an object of my invention to provide an improved needle construction for controlling the flow of high temperature fluids which eliminates the problems heretofore encountered with previously known needles.

A further object of my invention has been to provide an improved hollow needle construction of uniform composition which may be subjected to extreme thermal shock without detrimentally affecting its operation.

A further object of my invention has been to provide an improved hollow flow control needle of refractory metallic material which may be machined longitudinally straight and radially concentric after fabrication and retain its machined tolerances after heatup to prevent detrimental runouts.

A still further object of my invention has been to provide an improved hollow needle construction completely fabricated from platinum or platinum alloy having perforated internal webbing forming a plurality of vented compartments therewithin which provide for even temperature distribution throughout the various compartments, and accordingly prevent warping of the needle when subjected to temperature variations.

Figure 2:
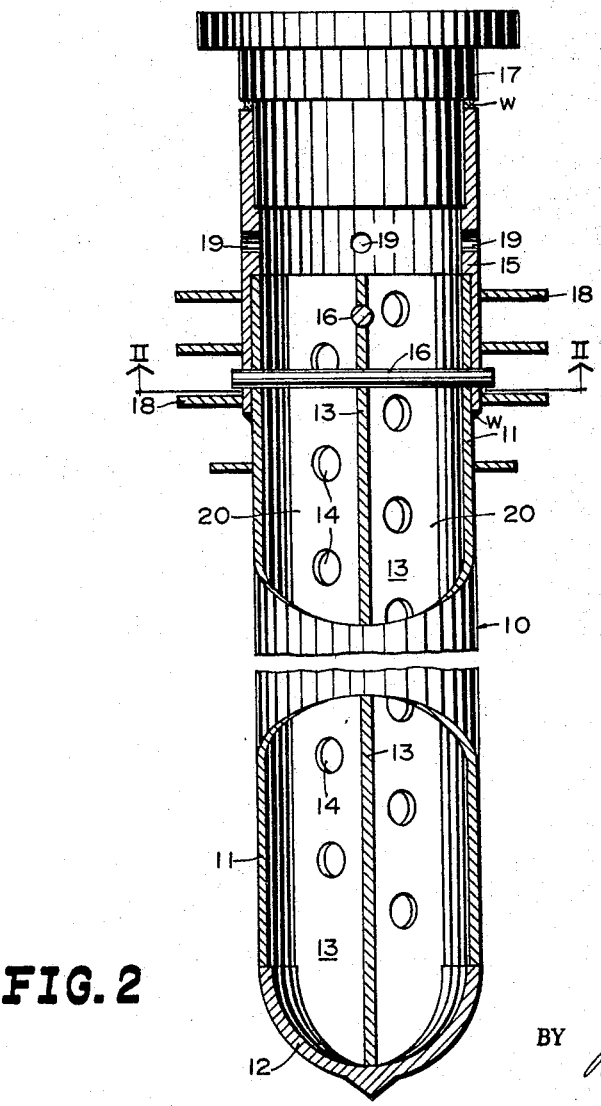

These and other objects of my invention will be apparent to those skilled in the art from the following disclosure and accompanying drawings in which:

FIGURE 1 is a side elevational view partially in section illustrating a preferred embodiment of the improved needle construction of my invention; and, FIGURE 2 is a cross sectional plan view taken along line II—II of FIGURE 1.

Referring now to the drawings, a needle 10 embodying my preferred construction is shown having a tubular outer shell or cylinder 11, a hemispherical cap or nose portion 12, and a plurality of internal ribs, webbing or strengthening beams 13 provided with openings or passages 14. The outer shell, nose portion, and internal ribs are preferably all formed of the same refractory metal composition and welded together to form a unitary rigid construction. The needle is fabricated from a refractory metal composition which is not readily oxidizable, such as platinum or a platinum alloy. Where the expected temperature of use is above about 1250–1300° C., it is desirable to strengthen the platinum by alloying it with rhodium so as to form an alloy containing from between about 10% to 40% rhodium. However, I have found that a 10% rhodium, 90% platinum alloy provides a satisfactory composition needle for most operations. As the temperature at which the needle is to be utilized increases, the amount of rhodium necessary to provide the desired strength also increases. However, as the percent of rhodium increases within the alloy, the difficulty of fabricating the needle also increases proportionally.

The shell 11 is secured to a needle connector sleeve or coupling adaptor 15, such as by a high temperature weld *w*. A pair of cross pins or dowels 16 extend through aligned openings in the shell 11 and connector 15, and are secured in place such as by welding. The pins function as a safety connection to retain the shell within the needle connector, should the high temperature weld *w* fail. The coupling adaptor 15 is secured to a standard needle connector shaft 17 by any suitable means such as a weld *w*. A plurality of cooling fins or discs 18 surround the upper end of the needle and the lower end of the connector sleeve to facilitate the cooling of the upper connecting end of the needle. In addition, the sleeve 15 is provided with a plurality of air vent openings 19 which allow the interior of the needle to remain at atmospheric pressure. This is particularly important upon heatup, since if not vented, the needle would otherwise be subjected to high internal pressures resulting in deformation and possibly rupture.

The crossed ribs or webbing 13 within the outer shell 11 function as strengthening beams to prevent the shell from buckling when subjected to extreme pressures and axial forces. A plurality of longitudinally-extending chambers or compartments 20 are formed by the ribs 13 and are in vented communicated with each other by means of openings or passages 14 formed in ribs 13. If one side of the needle should become hotter than the other, such as when the needle is subjected to uneven glass temperatures, the openings 14 allow an exchange of air among the various compartments 20 to equalize the temperature within and throughout the needle, thereby avoiding warping and the like which would otherwise result with closed compartments. If the compartments were not vented, the compartment on the hot side of the needle would be at a higher temperature than the other compartments, thus providing warping due to the uneven temperature distribution within the needle. The openings 14 are of such a limited size and spaced sufficiently far apart so as to not structurally detract from the strengthening provided by the beams 13, although they do tend to decrease the overall weight of the needle.

Since the composition of the needle is uniform throughout its construction in that the shell, nose portion, and internal webbing are all formed of the same high temperature refractory metal composition, such as platinum or platinum alloy, it is possible to machine the needle after fabrication so as to provide perfect straightness along its longitudinal extent and perfect concentricity about its radial extent, without removing a clad metal as in the past. Further, since the needle is of uniform composition, it can withstand extreme heat shock and maintain dimensional stability after heatup without spalling, cracking, warping, or differential thermal expansion which occurred in the previously known refractory or clad molybdenum needles. With my improved construction it is possible to obtain less than five thousandths total indicated reading in runouts, whereas the platinum clad molybdenum needle would normally provide only forty thousandths total indicated reading in runouts and the refractory needle may provide at best only about one hundredth thousandths total indicated reading.

In addition, the all-platinum or platinum alloy needle construction provides for an extended life, since if a puncture should occur in the platinum and glass is allowed to enter therein, it does not affect the operation of the needle, whereas in the past if a puncture did occur in the platinum clad molybdenum needle, the needle became useless through the oxidation of the molybdenum core.

Although I have disclosed the now preferred embodiments of my invention, it will be apparent to those skilled in the art that various changes and modifications may be made thereto without departing from the spirit and scope thereof as defined in the appended claims.

I claim:

1. An improved needle construction comprising, a hollow elongated shell, a nose portion closing the lower end of said shell, longitudinally-extending plate-like strengthening ribs extending across the interior of said shell and secured to opposed interior surface portions thereof, said plate-like strengthening ribs intersecting internally of said shell along a longitudinally-extending axis thereof and forming a plurality of compartments within said shell, passage means extending through said strengthening ribs for maintaining the various compartments in open communication with one another; and said shell, said nose portion, and said strengthening ribs all being formed of a high temperature refractory metal composition having high oxidation resistant properties.

2. An improved needle construction for immersion within and controlling the flow of high temperature fluids which comprises, an elongated hollow cylindrical body portion, a coupling connector secured to the upper end of said body portion, a cap member secured to the lower end of said body portion, plate-like internal webbing extending across said body portion and secured to opposed internal surface portions thereof, a plurality of longitudinally-extending compartments formed within the hollow needle by said plate-like webbing, passage means extending through said webbing for maintaining the various compartments in open communication with one another, means for venting the interior of said needle to the atmosphere, and at least the lower end of said cylindrical body portion and said cap member, which are normally immersed within the high temperature fluid, being formed of a refractory metal composition.

3. An improved needle construction for controlling the flow of molten glass which comprises, a hollow metal shell, a metal nose cap formed on one end of said shell, a plurality of metal strengthening beams secured to an interior surface of and extending across said metal shell, said strengthening beams extending along the longitudinal extent of said shell and downwardly into said nose cap forming a plurality of adjacent longitudinally-extending compartments within said needle, open portions formed through said strengthening beams for maintaining said longitudinally-extending compartments in open communication with each other, a coupling connector secured to the upper end of said metal shell, vent means for venting the interior of said needle to the atmosphere, means for cooling the upper portion of said needle; and said metal shell, nose cap, and strengthening beams all being formed of a uniform metallic composition selected from the group consisting of platinum and platinum rhodium alloys.

4. An improved needle construction as defined in claim 3 wherein said shell is weldably secured to said connector and a pair of pins extend through said shell and said connector to retain said shell should the welded connection fail.

References Cited

UNITED STATES PATENTS

| 1,480,991 | 1/1924 | Casto | 65—375 |
| 1,512,374 | 10/1924 | Soubier | 65—362 XR |
| 1,635,439 | 7/1927 | Schram | 65—362 XR |
| 1,944,844 | 1/1934 | Peiler et al. | 65—356 XR |
| 3,157,482 | 11/1964 | Nero et al. | 65—362 XR |
| 3,224,860 | 12/1965 | Stinnes | 65—362 XR |
| 3,230,060 | 1/1966 | Lippman | 65—374 XR |

DONALL H. SYLVESTER, *Primary Examiner.*

F. W. MIGA, *Assistant Examiner.*